United States Patent
Nordin et al.

[15] 3,705,602
[45] Dec. 12, 1972

[54] SPRING BIASED CHECK VALVE FOR PIPE BRANCHES

[72] Inventors: Lars-Erik Reinhold Nordin, Täby; Lars William Anshelm Möllerfors, Sundbyberg, both of Sweden

[73] Assignee: Stenberg-Flygt AB, Solna, Sweden

[22] Filed: Dec. 31, 1969

[21] Appl. No.: 889,496

[30] Foreign Application Priority Data

Jan. 10, 1969 Sweden................................319/69

[52] U.S. Cl..............................137/512, 137/527.4
[51] Int. Cl..............................................F16k 15/03
[58] Field of Search........137/606, 527, 527.4, 527.8, 137/512, 512.5, 112, 111

[56] References Cited

UNITED STATES PATENTS

| | | | |
|---|---|---|---|
| 3,586,038 | 6/1971 | Jahrstorfer | 137/512 |
| 2,017,033 | 10/1935 | McGuffin | 137/606 |
| 2,268,806 | 1/1942 | Curtis | 137/527 |
| 3,009,475 | 11/1961 | Richterkessing | 137/512.5 |
| 3,023,771 | 3/1962 | Hinds | 137/527 |
| 3,072,141 | 1/1963 | Wheeler | 137/512.1 |
| 3,074,427 | 1/1963 | Wheeler | 137/512.1 |
| 3,172,424 | 3/1965 | Stillwagon | 137/527.4 |

Primary Examiner—Martin P. Schwadron
Assistant Examiner—William H. Wright
Attorney—Sughrue, Rothwell, Mion, Zinn & Macpeak

[57] ABSTRACT

Non-return valve for positioning in a pipe socket and having a flap member rotatable around a shaft. The shaft is arranged in a plane at a given distance from the plane of the flap, whereby the flap in an open position is passed circumfluently by the medium flowing through the valve.

6 Claims, 2 Drawing Figures

SPRING BIASED CHECK VALVE FOR PIPE BRANCHES

BACKGROUND OF THE INVENTION

1. Field of the Invention

The invention relates to a non-return valve embodying a flap rotatably arranged in a pipe socket, valve housing or the like, and especially to the arrangement of the rotating shaft of the flap.

2. Description of the Prior Art

In twin pumps, for example, a flap valve is usually used which alternately closes one of two inlets and at the same time opens the other. Such valves, however, give rise to disturbing noise when they change from one to the other position.

In order to eliminate such disturbing noise, attempts have been made to introduce devices for damping of the impact which arises when the flap changes from one position to another. The seatings, for example, have been provided with a packing of flexible material, e.g., rubber, but difficulties have arisen in getting these packings to remain in position. Attempts have also been made to enclose the flaps entirely in rubber, which has led to some damping of the noise, but in valves intended for example for use in hot water systems the rubber quickly ages and its silencing effect thus disappears after some time.

The method of arranging a flap valve for each inlet in order to avoid noise is also known. In this case the valves are spring-loaded in such a way that they open against spring pressure. Change-over from one of the two pumps of the twin pump to the other is effected by shutting down the operating pump, after which both pumps are kept shut-down for a moment so that the open valve has time to close.

Practical tests have shown, however, that valves of this kind must be fairly heavily spring-loaded in order definitely to close when changing from one pump to another. This requires a fairly large force to keep the valve open, which is done under the influence of the flowing medium. Especially in large installations large annual losses are incurred in this way.

SUMMARY OF THE INVENTION

The present invention is intended to eliminate these drawbacks and at the same time to create a non-return valve which works without disturbing noise. The non-return valve according to the invention comprises a flap rotatably arranged in a pipe socket, valve housing or the like, and is characterized essentially in that the axis of rotation of the flap is arranged in a plane at a certain distance from the plane of the flap or of a diffusion vane arranged on it, so that the flap or diffusion vane, in a position corresponding to the open valve, is passed circumfluently by the medium flowing through the valve.

The flap may suitably consist of a disc from which, at a certain angle to the plane of the disc, there projects at least two lugs carrying the shaft around which the flap is intended to rotate. In order that the flap may be effectively passed by the medium flowing through the valve, the lugs are arranged in a plane perpendicular to the plane of the flap and at a given angle with the plane of the flap. In this way it is achieved that every normal to the flap falls to the side of the axis of rotation.

According to an advantageous further development of the invention two flaps with common rotating shaft are arranged in conjunction with twin pumps and spring-loaded with a spring extending between the flaps.

From measurements of losses through a valve according to the invention it has appeared that the losses are reduced to about one-tenth of those of conventional flap valves. In larger installations for continuous operation a reduction of the losses of this order naturally leads to considerable annual financial gains.

Since valve housing for the purpose in question are generally made by casting, their dimensions cannot be kept within narrow tolerances. This results in the fact, for example, that the positions of the valve seatings vary somewhat from valve housing to valve housing and, if the valve seatings are not to be adjusted by machining, the valves must be so suspended that in closed position they fit the positions of the valve seatings. This can be achieved, for example, by allowing some play in the mounting of the flaps around their rotating shaft. This play, however, means that an open flap can be caused to vibrate, with disturbing noise as a result.

According to a further development of the invention this drawback as well is eliminated by mounting the flaps with close fit around a sleeve which is mounted with some play on the common shaft for the flaps.

This arrangement for mounting of the flaps means that a flap, owing to the play between the sleeve and the common shaft for the flaps, can close tightly against a valve seating even if the position of the seating deviates somewhat from the designed position. As one flap is to be open when the other is closed, a certain pressure is obtained in the valve housing deriving from the flowing medium, so that the closed flap is held pressed against its valve seating, thereby fixing in position the sleeve on which the flap is rotatably mounted with close fit. The open flap, which is likewise mounted on the sleeve with close fit, thus obtains fixed pivoting points, so that vibrations in the flap are prevented, and also the occurrence of disturbing noise.

The rotatable arrangement of the flaps around a sleeve has a further advantage, namely in conjunction with the mounting of the flaps in a valve housing. The flaps can in this case be mounted on the sleeve outside the valve housing, together with a spring, to form a unit which is then introduced into the valve housing and secured in it by means of a shaft passing through the sleeve. This is a far simpler operation than that required if the flaps and spring are to be fitted separately in correct positions in the valve housing before the common shaft for the flaps is inserted in position.

BRIEF DESCRIPTION OF THE DRAWINGS

With reference to the attached drawings two embodiments of the invention will now be described.

DESCRIPTION OF PREFERRED EMBODIMENT

Figure 1:
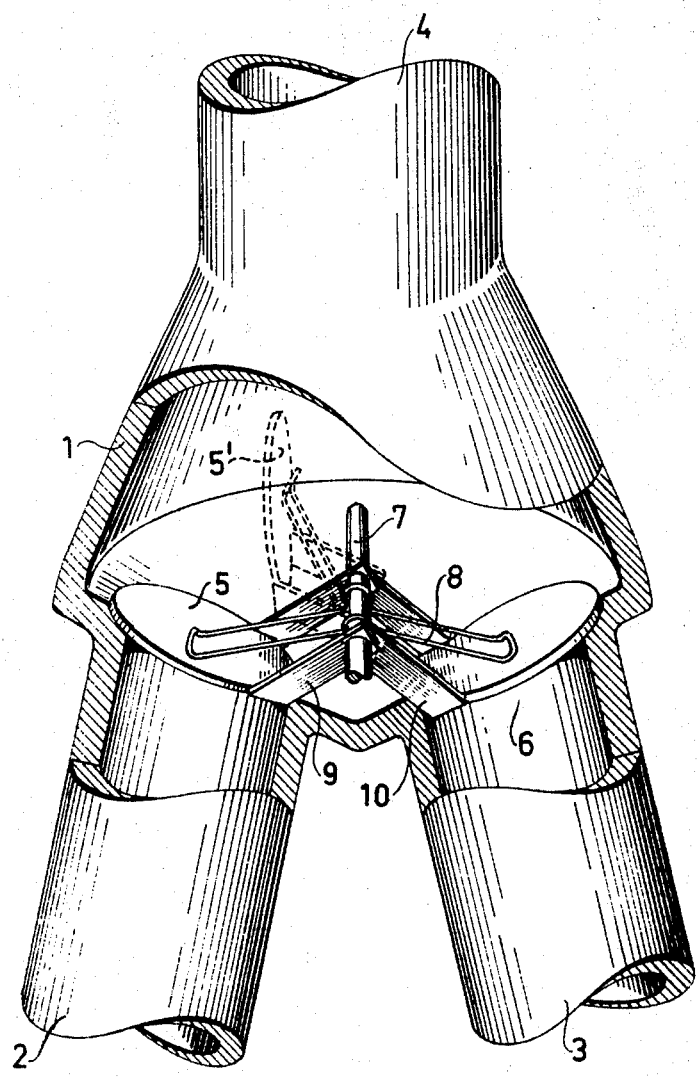
FIG. 1 shows a valve housing, comprising two return valves.

FIG. 1 shows a valve housing 1 with two inlets 2, 3 and a common outlet 4 for the medium which is to flow through the valve housing. In the valve housing there are two flaps 5, 6 each having lugs 9, 10 for carrying a shaft 7 around which the flaps 5 and 6 are rotatably arranged. By means of a spring 8 the flaps 5 and 6 are pressed towards their respective seating.

If the pressure rises, for example, in inlet pipe 2 owing to clogging of a pump connected to that pipe, flap 5 opens under the influence of the pressure from the medium in inlet 2 and against the force of the spring 8. After the flap has opened, it assumes the position 5' marked by the dotted line. In this position the flap is passed circumfluently by the flowing medium and assumes a position which varies slightly according to the rate of flow. When the pressure in the inlet 2 falls, in conjunction with changing from one pump to another, flap 5 closes under the influence of spring 8, which takes place without impact and thus without generation of noise. When another pump is then put into operation and the pressure in inlet 3 rises, flap 6 opens in a manner corresponding to flap 5.

The reason why the losses through a valve according to the invention are considerably lower than through hitherto known valves would appear to be the fact that conventional valves are kept in open position owing to the pressure of the flowing medium on one side of the flap, the which pressure has only a small component in a direction perpendicular to the flap, so that a fairly large force is required to keep the flap open against the force of the spring. In a valve according to the invention, on the other hand, the flap is passed circumfluently by the flowing medium and at least part of the flow losses which always arise in a valve are used to keep the flap open. There is thus an interplay between a positive pressure on one side of the flap and a negative pressure on its other side, which keeps the flap in open position when medium flows through either of inlets 2 and 3.

Figure 2:
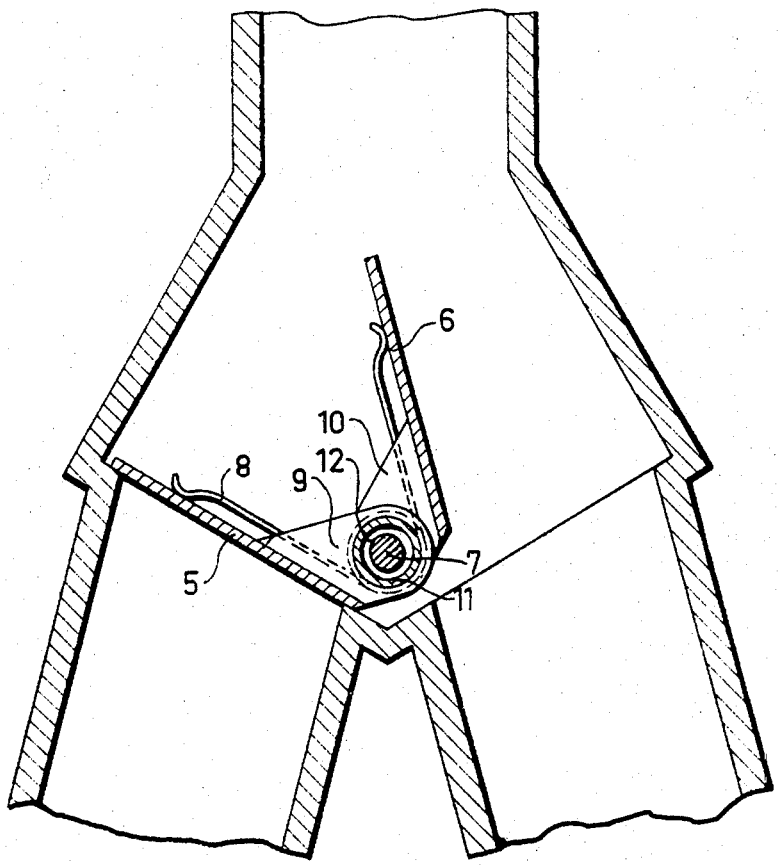
FIG. 2 shows a cross-section through an alternative suspension of the flaps according to the invention.

FIG. 2 shows how the flaps 5 and 6 are mounted with close fit on a sleeve 11, which in turn is mounted with a certain play 12 on the common shaft 7 of the flaps. When one flap 6, under the influence of pressure from a flowing medium, is caused to assume an open position, the other flap 5 closes under the influence of spring 8. Owing to the play 12 existing between the sleeve 1 and shaft 7 the position of flap 5 can be adapted to its valve seating even if the position of the seating, owing to small imperfections in manufacture of the valve housing, deviates slightly from the intended position. Owing to the pressure exercised by the medium flowing through the valve housing on the closed flap 5, the latter, and therefore the sleeve 11, is held in a fixed position. Thereby it is achieved that the open valve 6 which, like flap 5, is rotatably mounted around the sleeve 11 with close fit, obtains fixed pivoting points and is thus not brought into vibration.

With this arrangement of the flaps 5, 6 around a sleeve 11 an extremely efficient and silent operating non-return valve for twin pumps is obtained.

Although the invention has been described with reference to one of its embodiments, it can be arbitrarily varied within the scope of the following claims.

What we claim is:

1. A non-return valve assembly for fluids comprising a valve housing having a seat and at least one conduit having an inlet and outlet passage;
a flap rotatably arranged in the valve housing and having a pair of lugs, the flap adapted to seal against the valve housing seat, and
a shaft positioned in the valve housing so that it is on one side of the fluid flowing through the valve when the valve is in an open position, the lugs connecting the flap to the shaft and projecting perpendicularly to a plane containing the flap a distance which is greater than a perpendicular distance from the center of the shaft to an elongation of a plane tangential to the side of the conduit nearest the shaft in the valve housing, so that the flap, when open, is passed circumfluently by the fluid flowing through the valve.

2. A non-return valve as in claim 1 further including spring means on the shaft biasing the flap to a closed position with respect to the valve housing seat.

3. A non-return valve as in claim 2 where the plane of the flap in the closed position is such that any perpendicular to the plane will lie on one side of the shaft.

4. A non-return valve as in claim 3 where the valve housing has two "Y" branch-shaped inlet conduits with respective seats and a common outlet conduit, and a second flap has a pair of lugs and is arranged to seal against the second conduit and seat, whereby the shaft is positioned between both inlet conduits in the outlet conduit and pivotably supports the lugs of both flaps.

5. A non-return valve as in claim 4 where each of the lugs have over-sized diametrical bores with respect to the diameter of the shaft to permit a loose connection with the shaft, whereby each flap when in an open position permits the fluid flowing through its respective conduit to flow circumferentially about the flap.

6. A one way flow valve assembly for controlling the flow of fluid from two inlet conduits into a single outlet conduit comprising a "Y"-shaped branched valve housing having a pair of inlet conduits and a single outlet conduit, the inlet conduits forming an acute angle at their junction;
seating means including a flap member for sealing each inlet conduit;
a shaft positioned in the outlet conduit and between each inlet conduit adjacent their junction;
a pair of lugs on each flap member having diametrically over-sized bores relative to the shaft, the shaft positioned through the bores to permit a pivotable rotation of each flap member; and
a u-shaped spring connecting each flap member to the shaft for biasing the respective flap members to a sealed closed position, each flap member positioned with respect to the shaft so that a plane containing the flap member in the closed position is such that any perpendicular to the plane will lie on the same side of the shaft as the flap member, the lugs which connect each flap member to the shaft project from the plane of the flap member, a distance which is greater than a perpendicular distance form the center of the shaft to an elongation of a plane tangential to the side of the respective inlet conduit nearest the shaft whereby each flap member when in an open position permits the fluid flowing through the respective conduit to flow circumferentially about the flap member.

* * * * *